US005802690A

United States Patent [19]

Bullock

[11] Patent Number: 5,802,690

[45] Date of Patent: Sep. 8, 1998

[54] TOOL FOR RECONNECTING A FUEL HOSE SAFETY BREAK AWAY

[76] Inventor: Rothel J. Bullock, 11509 DeHam Dr., Louisville, Ky. 40241

[21] Appl. No.: 513,476

[22] Filed: Aug. 10, 1995

Related U.S. Application Data

[63] Continuation-in-part of Ser. No. 373,104, Jan. 17, 1995, Pat. No. 5,566,438.

[51] Int. Cl.[6] .............................. B23P 19/04

[52] U.S. Cl. .............................. 29/237; 29/268; 81/426.5; 81/423

[58] Field of Search .............................. 29/268, 237, 234, 29/235, 282, 280, 255; 81/423, 424.5, 426, 426.5, 418, 422, 415, 386, 387, 385

[56] References Cited

U.S. PATENT DOCUMENTS

| | | | |
|---|---|---|---|
| 713,189 | 11/1902 | Yates | 269/283 |
| 807,315 | 12/1905 | Perron et al. | 269/283 |
| 869,527 | 10/1907 | Shears | 81/387 |
| 1,019,605 | 3/1912 | Cummings | 81/386 |
| 3,176,551 | 4/1965 | Hansen | 81/423 |
| 3,192,805 | 7/1965 | Manning | 81/414 |
| 3,299,496 | 1/1967 | Christensen | 29/237 |
| 3,845,538 | 11/1974 | Demler, Sr. | 29/234 |
| 4,170,125 | 10/1979 | Minka | 29/237 |
| 4,306,709 | 12/1981 | Hurn | 269/283 |
| 4,757,588 | 7/1988 | Churchich | 29/235 |
| 4,893,393 | 1/1990 | Marshall | 29/237 |

FOREIGN PATENT DOCUMENTS

| | | | |
|---|---|---|---|
| 3125829 | 1/1983 | Germany | 269/166 |

OTHER PUBLICATIONS

Page from 1989 Granges Catalog Showing Locking Bar Clamps, Other Info Unknow.

*Primary Examiner*—Robert C. Watson
*Attorney, Agent, or Firm*—Middleton & Reutlinger; James C. Eaves, Jr.

[57] ABSTRACT

A tool for reconnecting a fuel hose safety break away. Various geometry safety break aways are attached to various diameter fuel hoses, typically above a person's head. These safety break aways separate if a vehicle drives away from a fuel pump with the fuel nozzle still attached to the vehicle. The tool of the present invention assists the person having to reconnect the two halves of the safety break away. While individual tools for various geometry safety break aways and different hose diameters can be made, so that a service station does not have to obtain several different tools for their various fuel pumps, the tool of the preferred embodiment has a plurality of user selectable jaws, the jaws having hose engaging portions with similar geometry to the hoses they are to engage. Further, the tool is adjustable, for example, using a channel lock type configuration for the two members, so that the jaws can be moved closer together or further apart to be the proper spacing for the particular safety break away being reconnected. Instead of a channel lock type configuration, one of the members can have an extended portion which receives a jaw receiving portion which is movable therealong. The selected jaws can be securely retained by the members.

18 Claims, 7 Drawing Sheets

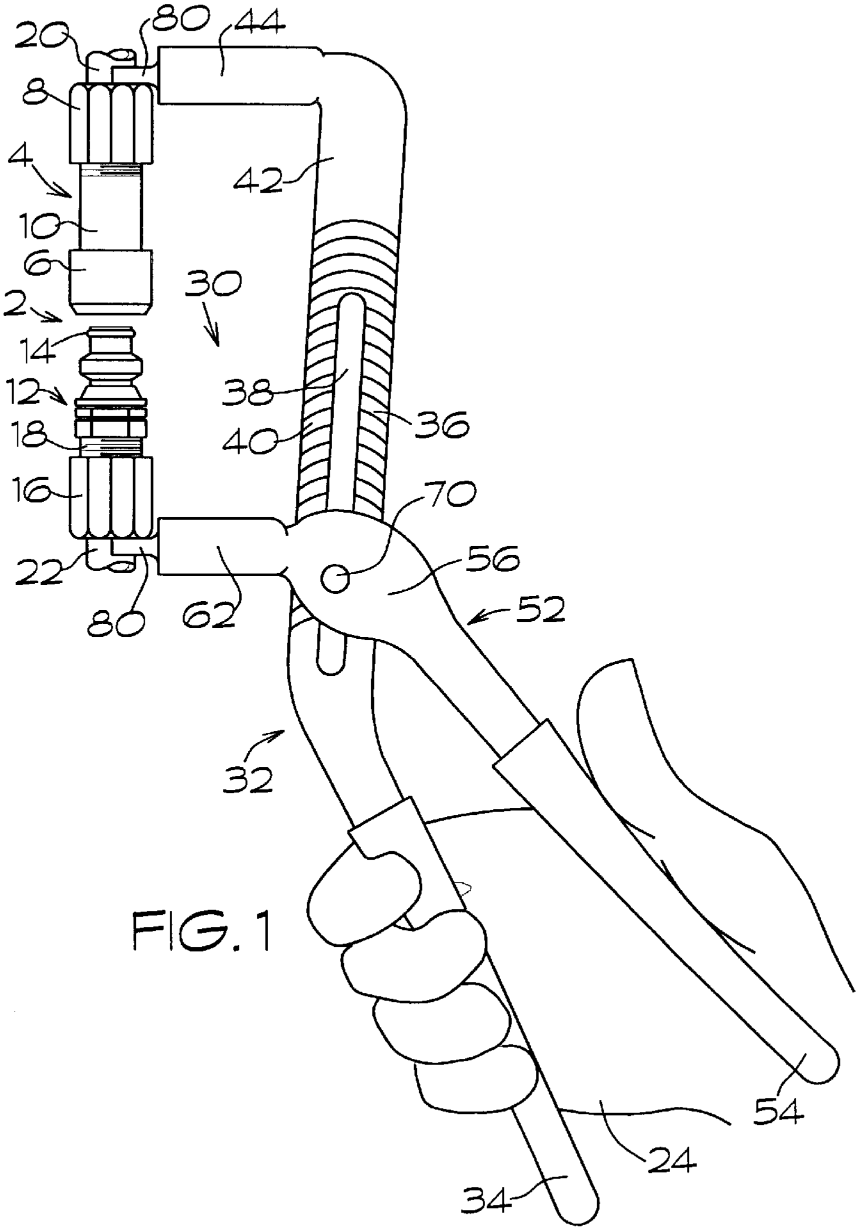
FIG. 1
FIG. 2
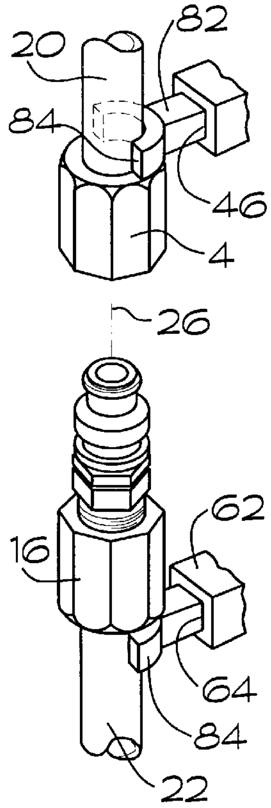

TOOL FOR RECONNECTING A FUEL HOSE SAFETY BREAK AWAY

This is a continuation-in-part application of application

BACKGROUND OF THE INVENTION (a) Field of the Invention

The present invention relates to a tool for reconnecting a fuel hose safety break away. At a filing station, if a vehicle operator drives away from a fuel pump with the fuel nozzle still attached to the vehicle, two halves of a safety break away will separate, permitting the nozzle and a nozzle end portion of the safety break away and fuel hose therebetween to stay with the vehicle, while a hose end portion of the safety break away remains attached to the hose from the pump, the hose end portion of the break away cutting off possible fuel flow. The tool of the instant invention aids a person in reconnecting the two portions of the safety break away to restore the fuel pump to operation.

(b) Description of the Prior Art

U.S. Pat. No. 4,893,393, to Marshall, teaches a pipe fitting assembly tool having a pair of clamps attachable to two pieces of pipe, the clamps being attached to the ends of two pivotally connected scissor-type handles for moving the clamps, and thus the pipes, together or apart.

U.S. Pat. No. 4,757,588, to Churchich, teaches push-on hose pliers, the pliers having a jaw to engage a fitting and a second hose grasping jaw for locking in place on a hose.

U.S. Pat. No. 3,845,538, to Demler, Sr., teaches a hand tool for assembling tubular connecting devices. U.S. Pat. No. 3,299,496, to Christensen, teaches a tool for coupling hydraulic hoses.

U.S. Pat. No. 3,192,805, to Manning, teaches adjustable channel lock type pliers. U.S. Pat. No. 3,176,551, to Hansen, teaches pliers having different shaped jaws which can be used therewith.

Locking bar clamps are known which have a fixed jaw and an adjustable jaw which can be moved along a bar to a desired location and an item can be locked between the jaws.

SUMMARY OF THE INVENTION

The present invention is for a tool for reconnecting a fuel hose safety break away. Various geometry safety break aways are attached to various diameter fuel hoses, typically above a person's head. These safety break aways separate if a vehicle drives away from a fuel pump with the fuel nozzle still attached to the vehicle. The tool of the present invention assists the person having to reconnect the two halves of the safety break away.

While individual tools for various geometry safety break aways and different hose diameters can be made, so that a service station does not have to obtain several different tools for their various fuel pumps, the tool of the preferred embodiment has a plurality of user selectable jaws, the jaws having hose engaging portions with similar geometry to the hoses they are to engage.

Further, the tool is adjustable, for example, using a channel lock type configuration for the two members, so that the jaws can be moved closer together or further apart to be the proper spacing for the particular safety break away being reconnected. Alternatively, rather than a channel lock type configuration, a first member and a second member can be pivotally connected, the second member having a jaw attachable thereto, the first member having a jaw movable therealong to space the jaws at a desired spacing. The selected jaws can be securely retained by the members.

Finally, the present invention comprises a tool for reconnecting a hose end and a nozzle end of a fuel hose safety break away so that a fuel may flow therethrough, the hose end being connected to a pump hose having a first geometry and the nozzle end being connected to a nozzle hose having a second geometry, the tool including at least a first and a second receivable jaw, the first and the second jaw having a hose engaging portion, the hose engaging portion connected to at least one shaft, the hose engaging portion of the first jaw having a first shape to receive at least a portion of the pump hose first geometry and to abut the hose end of said safety break away, the hose engaging portion of the second jaw having a second shape to receive at least a portion of the nozzle hose second geometry and to abut the nozzle end of the safety break away; a first member and a second member, the first and the second members having a pivotal connection therebetween, the first member having a first end and a second end, the second member having a first end and a second end, the first ends of the first and the second members being a handle portion, the first member including means for receiving the at least one shaft of the first receivable jaw, the receiving means being movable along a portion of the first member, and the second end of the second member including means for receiving the at least one shaft of the second receivable jaw, the first receivable at least one jaw shaft being received by the first member receiving means and the second receivable at least one jaw shaft being received by the second member receiving means.

BRIEF DESCRIPTION OF THE DRAWINGS

A better understanding of the present invention will be had upon reference to the following description in conjunction with the accompanying drawings, wherein:

FIG. 1 shows a perspective view from the side of a tool of the preferred embodiment as it would be used to reconnect the two ends of a first type safety break away;

FIG. 2 shows a perspective view from above showing the jaws of a tool of the preferred embodiment as the tool would be used to reconnect the two ends of a second type safety break away;

DETAILED DESCRIPTION OF THE PREFERRED EMBODIMENT

Figure 4:
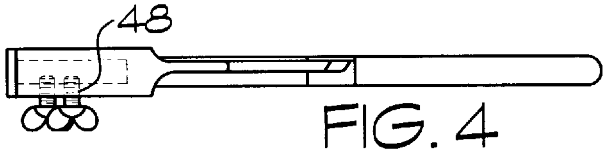
FIG. 4 shows a top view of the tool of FIG. 3.

The present invention relates to a tool 30, 300, 330, 430, 530, or 630 for reconnecting a fuel hose safety break away 2. With reference to FIG. 1, break away 2 is shown having a hose end 4 and a nozzle end 12. Hose end 4 is connected to the hose 20, which is connected to a fuel pump (not shown). With fuel pumps of today, the fuel hose often originates about six or more feet above the ground. Hose end 4 is typically placed at about this height. Therefore, to insert nozzle end 12 into hose end 4, a person typically would have to work above his head or would have to get on a ladder. Reconnecting ends 12 and 4 requires force, particularly because the hose end 4 has a fuel flow stop valve which has fuel back pressure on it. This fuel flow stop valve must be opened to reactivate the fuel pump.

Hose end 4 is shown having a female portion 6, a hose connecting fitting 8, and an intermediate portion 10 therebetween. Nozzle end 12 is shown having a male portion 14, engageable with female portion 6 of hose end 4. Nozzle end 12 also has a hose connecting fitting 16 and an intermediate portion 18 between portion 14 and fitting 16. Hose connecting fitting 16 is attached to hose 22 which goes to the fuel dispensing nozzle (not shown).

Several manufacturers make safety break aways, for example, Husky, Catlow, OPW, Richards Industries, and Emco Wheaton. The geometry of each break away varies. For example, FIG. 2 shows a break away where the hose end 4 combines the female portion and hose connecting fitting into a single component. Ends 4 and 12 coaxially align along axis 26. While a tool of specific dimension could be made for each break away, to make a universal tool to fit break aways of differing lengths, tool adjustability is required.

Figure 6:
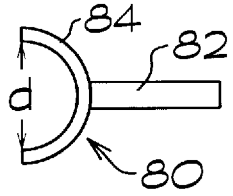
FIG. 6 shows a top view of a jaw useable with a tool for reconnecting the two ends of a safety break away.

Further, fuel hoses, such as hoses 20/22, vary in diameter. For example, a standard gasoline hose without vapor recovery is about ¾ inch in diameter; a standard gasoline hose with vapor recovery is about ⅞ inch in diameter; a standard diesel hose is about one inch in diameter. A ⅝ inch diameter hose is also sometimes used. Therefore, while a tool with jaws of specific diameter could be made for each hose type, to make a universal tool to fit hoses of differing diameter, tool jaw adjustability is required. So, as shown in FIG. 6, a plurality of pairs of jaws 80 can be provided, each jaw 80 having a hose engaging portion 84 having a desired diameter, identified by the letter "d".

Figure 3:
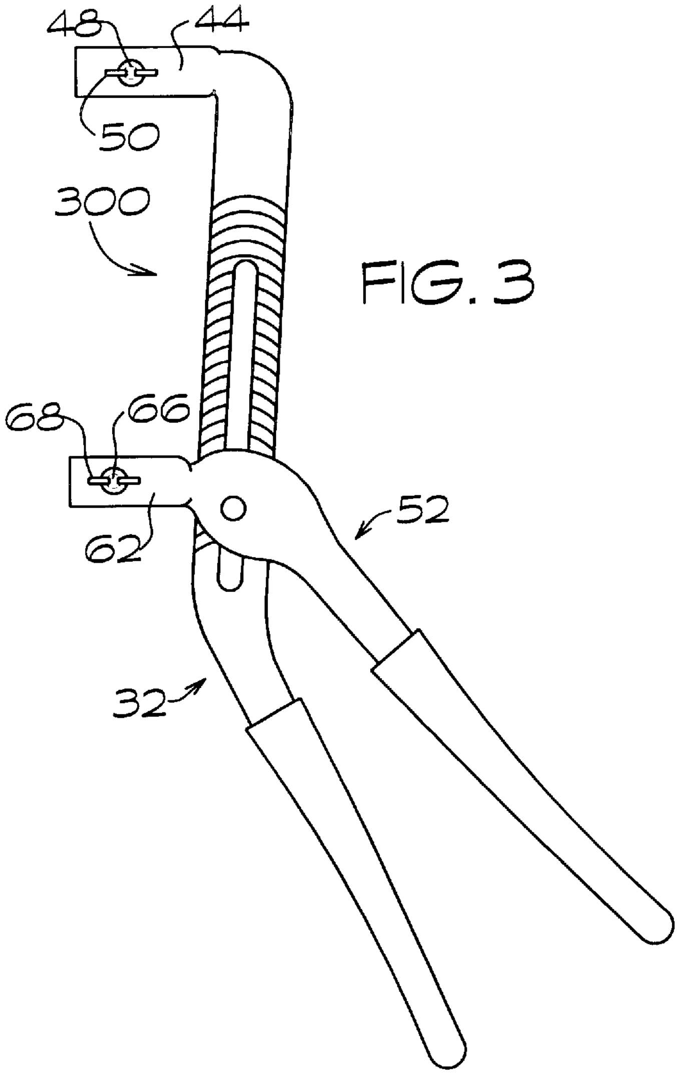
FIG. 3 shows a side view of a tool of a second preferred embodiment.
Figure 5:
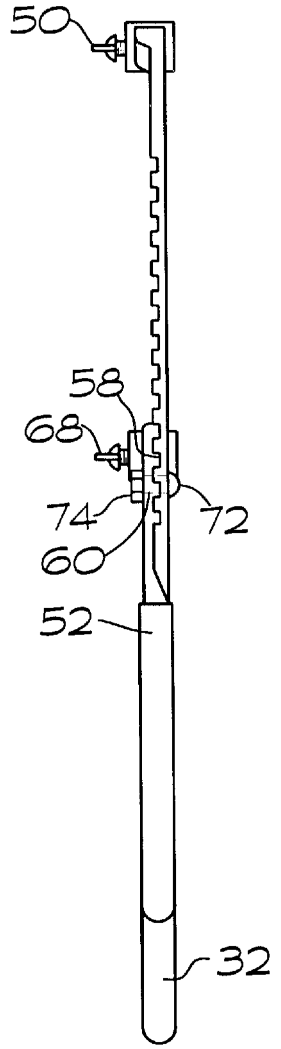
FIG. 5 shows a back view of the tool of FIG. 3.
Figure 7:
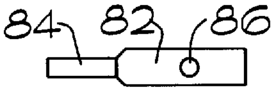
FIG. 7 shows a side view of the jaw of FIG. 6.
Figure 8:
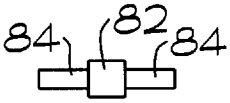
FIG. 8 shows a rear view of the jaw of FIG. 6.
Figure 9:
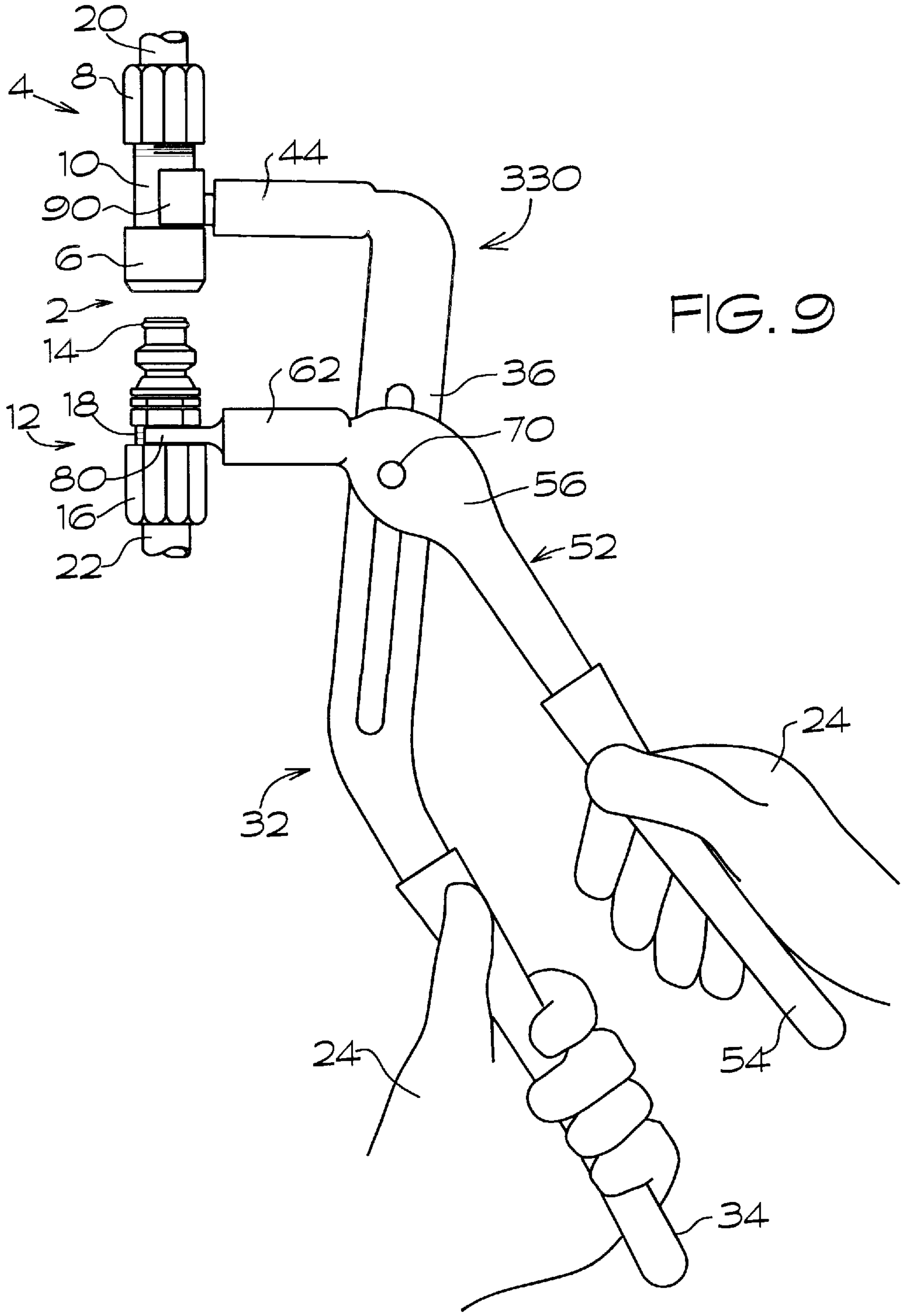
FIG. 9 shows a perspective view from the side of a tool of a third preferred embodiment.

With reference to FIGS. 1 and 2, a preferred embodiment tool 30 is shown. With reference to FIGS. 3–5, a second preferred tool 300 is shown. FIGS. 6–8 show a preferred jaw 80. FIG. 9 shows a third preferred tool 330. Tools 30, 300, 330 and jaws 80 can be made of various materials having sufficient strength for the tool's intended use. Examples are a polycarbonate thermoplastic, aluminum, or steel.

Tool 30 is shown having a pair of jaws 80. Jaws 80 are removably received by tool 30, so that jaws of different desired diameter or shape can be inserted into tool 30 for use with hoses of different diameters. Tool 30 is also adjustable, in that the pair of jaws 80 can be moved closer together or further apart. The ability to use different jaws and the ability to adjust the spacing between jaws permits tool 30 to be a universal tool, in that, for example, a pair of jaws 80 with diameter ("d") of 1 inch could be inserted into tool 30 and the jaws could be spaced to reconnect a break away for a diesel fuel pump or a pair of jaws with diameter ("d") of ¾ inch could be inserted into tool 30 and the jaws could be spaced to reconnect a break away for a non-vapor recovery gasoline fuel pump. Adjustability of tool 30 is accomplished in a way similar to a that of a "channel-lock" pliers, although other adjustment means can be employed.

Tool 30 has a first member 32, a second member 52, and a member connector 70. Each member 32/52 receives a jaw 80.

First member 32 has a handle portion 34, an adjustment portion 36, an extended portion 42, and a jaw receiving portion 46. Adjustment portion 36 includes an adjustment slot 38 and a plurality of channels 40 therealong. Jaw receiving portion 44 has an opening 44 thereinto for receiving shaft 82 of an upper jaw 80.

Second member 52 has a handle portion 54, an adjustment portion 56, and a jaw receiving portion 62. Adjustment portion 56 includes a channel engaging portion 58 and a bore 60 therethrough. Jaw receiving portion 62 has an opening 64 thereinto for receiving shaft 82 of a lower jaw 80.

Member connector 70 can be, for example, a threaded pin 72 with enlarged pin head and a nut 74. Threaded pin 72 passes through first member 32's adjustment slot 38 and through second member 52's bore 60 and nut 74 retains members 32/52 in a desired relationship, such that channel engaging portion 58 can securely engage a desired channel 40, or, by moving handles 34/54 apart to disengage channel engaging portion 58 from any channel 40, member connector 70 permits second member 52 to move so that channel engaging portion 58 can be securely engaged with a different channel 40. Other known means for connecting members 32/52 can be employed.

As shown, adjustment portion 36 and extended portion 42 of first member 32 permit jaws 80 to be spaced up to about 8 inches apart. Extended portion 42 dictates how close together jaws 80 can be placed, for example, about 3 inches apart.

The tool 30 of FIGS. 1 and 2 simply has the shaft 82 of upper and lower jaws 80 slidably received into respective openings 46 and 64. The tool 300 of FIGS. 3–5 is the same as tool 30, but with the additional feature that means for securely retaining jaws 80 in openings 46/64 is provided. With reference to FIG. 7, shaft 82 of jaw 80 is shown having an indentation 86 therein. Jaw receiving portions 44/62 of members 32/52 have a threaded bore 48/66, respectively, thereinto. When jaws 80 are inserted into openings 46/64, respective screws 50/68, for example, screws having winged heads for hand tightening, inserted into respective threaded bores 48/66 can be tightened to engage jaw 80 indentations 86 to secure the jaws 80 within the openings 46/64. Screws 50/68 can be loosened to replace one sized jaw 80 with another sized jaw 80.

FIG. 9 is a simplified diagram of a tool 330. Tool 330 does not have the long extended portion 42 as do tools 30 and 300. Therefore, if a similar adjustment slot 38 is employed, the jaw range of movement with respect to each other is similar, but the jaws can not be spaced as far apart as with tools 30, 300. However, tool 330 is designed so that the upper and lower jaws do not engage the interface between hose 20 and hose connecting fitting 8 and the interface between hose 22 and hose connecting fitting 16. Rather, tool 330's jaws engage intermediate portions 10 and 18. Therefore, the jaws do not need to be spaced as far apart as with tools 30 and 300. However, identical jaw pairs 80 employed with tools 30, 300 may not interface properly, as intermediate portions 10 and 18 may have different geometric parameters. Therefore, FIG. 9 shows a lower jaw 80, as used with tool 30, 300. However, a different sized jaw 90 is used for the upper jaw to properly interface hose end 4's intermediate portion 10. Therefore, tools 30 and 300 are the preferred tools, as hose diameters should be maintained as a more standard dimension than the intermediate portions of a unique manufacturer's break away.

While tool 330 is shown being operated with two hands 24, the one hand 24 use of FIG. 1 is preferred.

Figure 10:
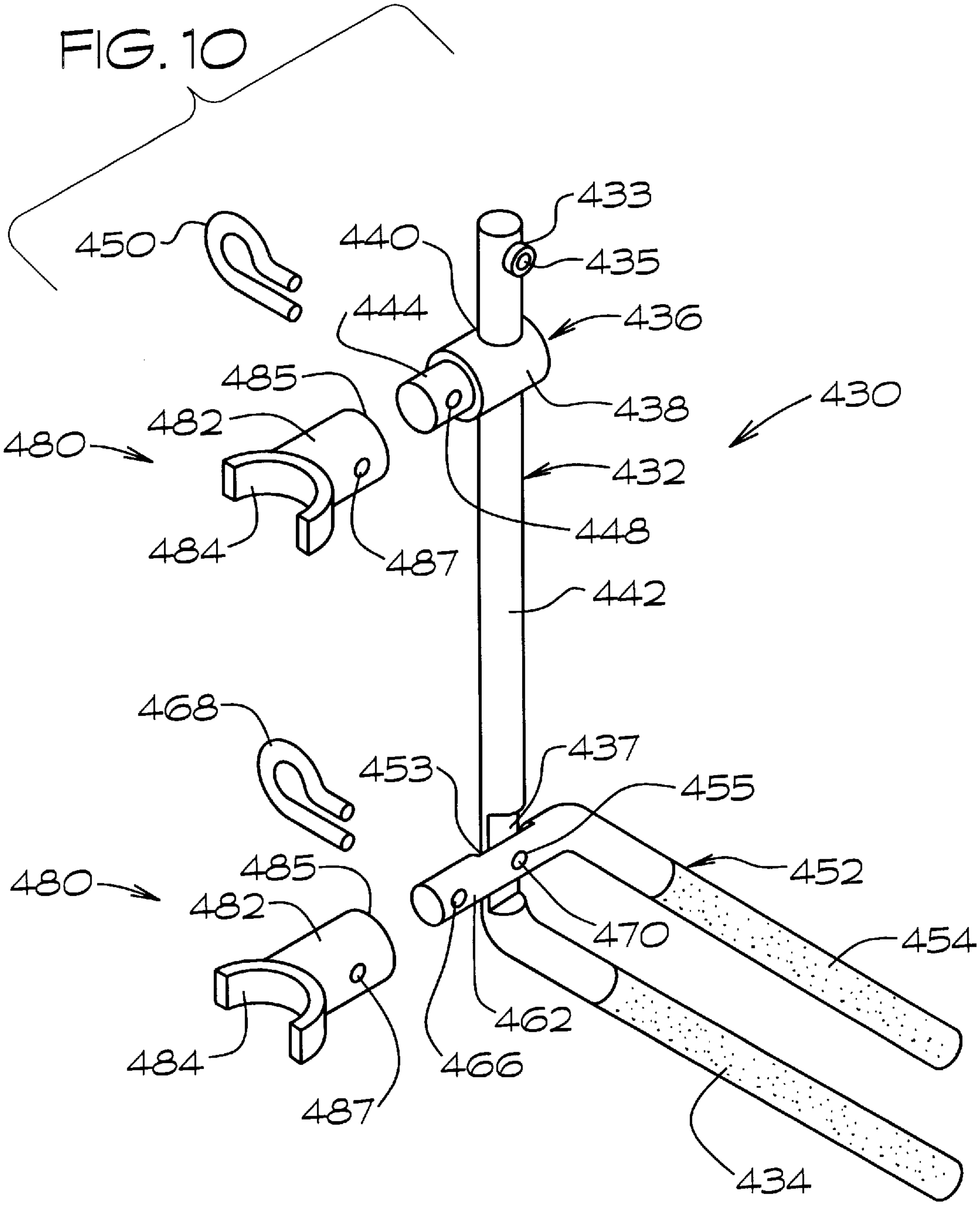
FIG. 10 shows a perspective partially exploded view of a tool of a fourth preferred embodiment.

FIG. 10 shows a fourth preferred tool 430 having a first member 432 and a second member 452, members 432 and 452 being of round rod having, for example, an outside diameter of ⅝ inch (1.6 cm). Preferably, with tool 430, only jaws 480 are cast, the other components being machined from round rod.

Figure 11:
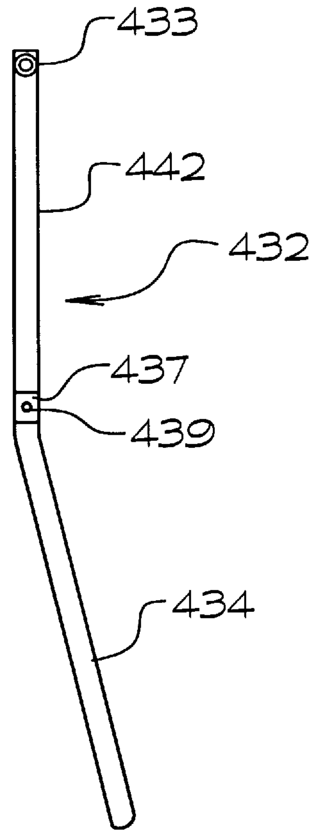
FIG. 11 shows a front view of the first member of the tool of FIG. 10.

First member 432, seen also in FIG. 11, has a handle portion 434 and an extended portion 442, the portions having a desired bend therebetween. At the lower portion of extended portion 442 is a flat 437 having a bore 439 therethrough. At the upper portion of extended portion 432 is a bore 433 having a retainer 435 therethrough. Retainer 435 retains an adjustable jaw receiving portion 436 on extended portion 432.

Adjustable jaw receiving portion 436 can be cast or, preferable, machined from a round rod of, for example, 1–1¼ inch (2.5–3.2 cm) outside diameter. Portion 436 has a bore 440 therethrough in adjustment portion 438. If first member 432 has a diameter of ⅝ inch (1.6 cm), bore 440 is has a diameter just slightly larger. This permits portion 436 to be moved up and down portion 442, but also to remain in place on portion 442 when jaws 480 are engaging hoses 20 and 22 (see FIG. 1) and handle portions 434 and 454 are being squeezed toward each other. Portion 436 has a jaw receiving portion 444 having a bore 448 therethrough. Portion 444 is sized to receive a jaw 480. As shown, portion 444 and members 432 and 452 all have the same diameter. However, portion 444 and jaw receiving portion 462 of member 452 could have reduced diameters.

Second member 452 has a handle portion 454 and a jaw receiving portion 462 with a desired angle bend therebetween. Toward the handle portion 454 of jaw receiving portion 462 is a flat 453 having a bore 455. Flats 437 and 453 mesh and bores 439 and 455 coaxially align and have a member connector 470 therethrough, for example, a nut and bolt. Jaw receiving portion 462 has a bore 466 toward its end.

As with the earlier described embodiments, many different jaws of differing shapes and diameters can be employed with the tool as determined by the hose and breakaway parameters. With tool 430, jaws 480 would have a shaft 482 having a hollow 485 thereinto and a bore 487 therethrough. With earlier embodiments, a jaw shaft was received by an opening in a member of the tool. With tool 430, jaw receiving portions 462 and 444 are received into respective hollows 485. Jaw retainers, shown, for example, as cotter-type pins or clips 468 and 450 are inserted through bores 487/466 to retain jaw 480 on portion 462 and through bores 487/448 to retain jaw 480 on portion 444, respectively. Jaws 482 have hose engaging portion 484 of desired geometry. As with earlier embodiments, handle portions 434 and 454 can be coated with, for example, a rubber or plastic material.

Figure 12:
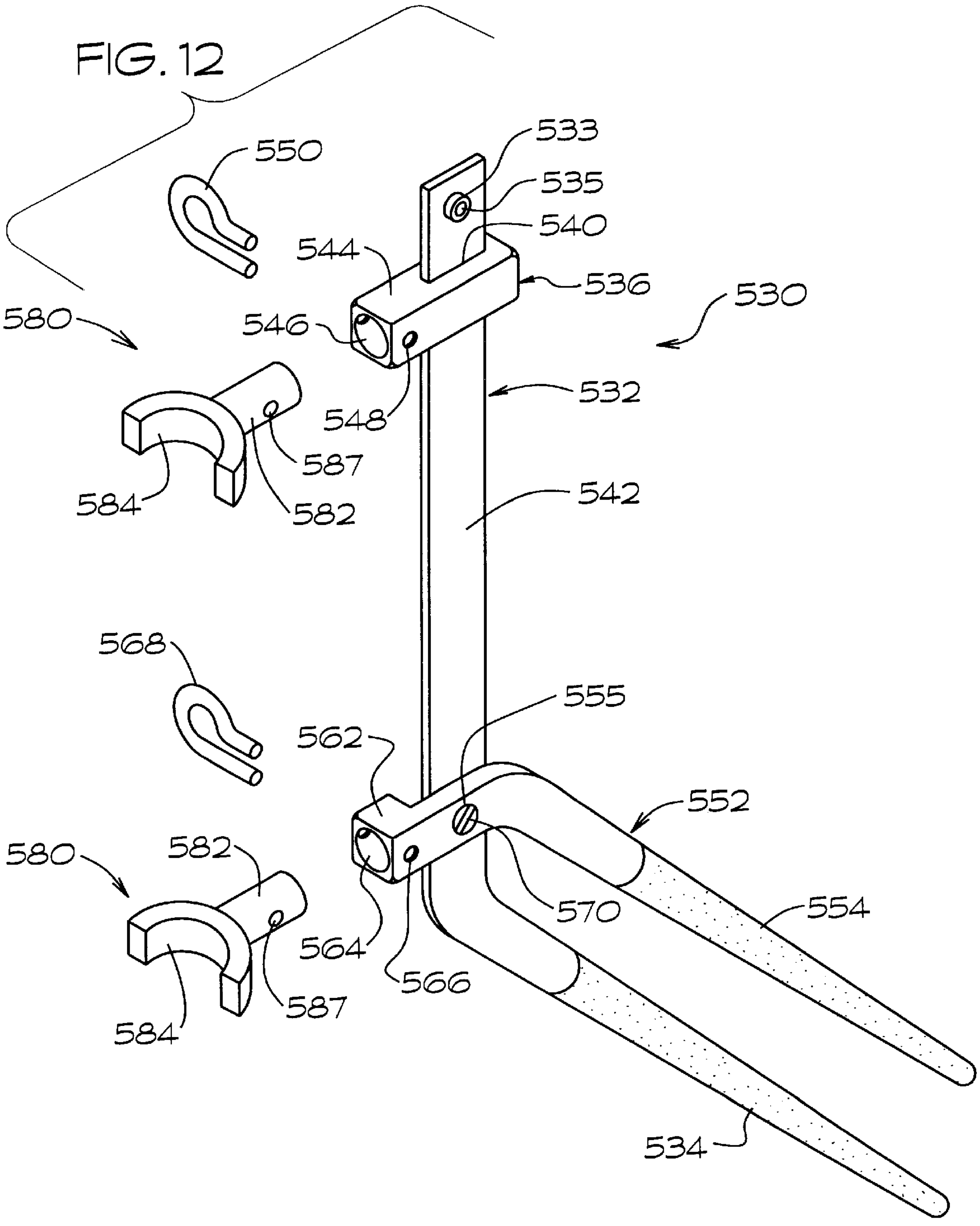
FIG. 12 shows a perspective partially exploded view of a tool of a fifth preferred embodiment; and, FIG. 13 shows a perspective partially exploded view of a tool of a sixth preferred embodiment.

FIG. 12 shows a tool 530 having first member 532 and second member 552. Members 532 and 552 may be cast as unitary pieces or member 532 may have handle portion 534 cast and have an extended portion 542 made of flat bar which is attached to cast portion 534. First member 532 has a bore 533 toward the top of portion 542, bore 533 having a retainer 535 therein. As with tool 430, retainer 535 retains a adjustable jaw receiving portion 536 on portion 542. Member 552 has a bore 555 therethrough and member 532 has a bore therethrough, the bores being in coaxial alignment and having a member connector 570 therethrough.

Portion 536 has a slot 540 therethrough. Slot 540 is sized just slightly larger than portion 542 so that portion 536 will be positioned along portion 542 and retained at a desired location with handle and hose pressure, as was explained above with tool 430. Portion 536 has a jaw receiving portion 544 having an opening 546 thereinto and a bore 548 therethrough.

Member 552 has a jaw receiving portion 562 having an opening 564 therein and a bore 566 therethrough. Jaws 580 are similar to jaws 80 of earlier embodiments. Jaws 580 have a shaft 582 having a bore 587 therethrough. Jaws 580 have a hose engaging portion 584. Shaft 582 of a jaw 580 is received by opening 546 and a jaw retainer 550 is inserted through bores 548/587. Shaft 582 of a jaw 580 is received by opening 564 and a jaw retainer 568 is inserted through bores 566/587.

Figure 13:
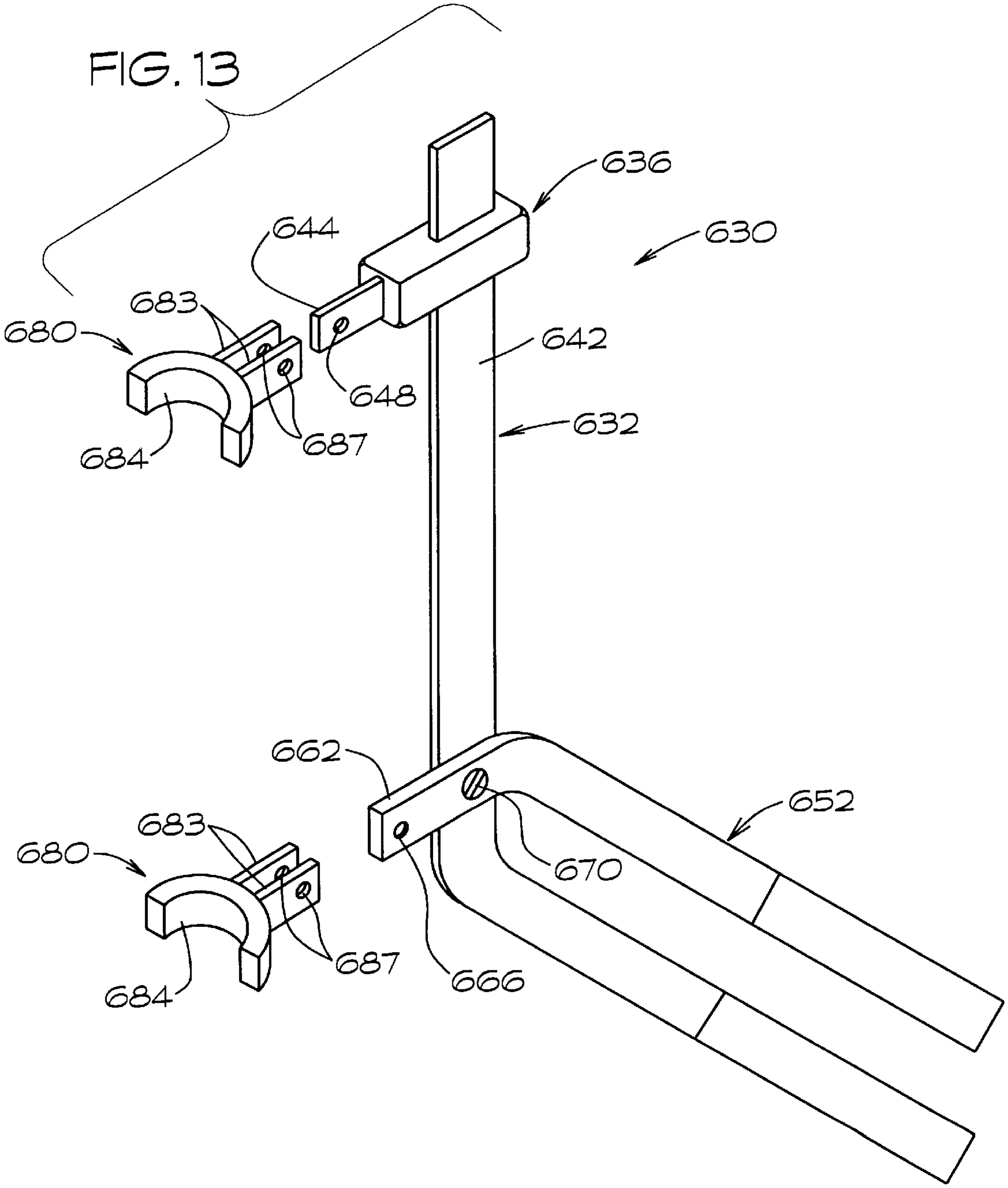

Tool 630 of FIG. 13 provides a final embodiment which only requires the jaws 680 and adjustable jaw receiving portion 636 to be cast, members 632 and 652 are made of flat bar and connected with a connector 670. Jaw receiving portion 662 of member 652 has a bore 666 therethrough. Portion 636 can slide on portion 642 and functions as portions 436 and 536 of tools 430 and 530. Portion 636 has a jaw receiving portion 644 having a bore 648 therethrough.

Jaws 680 have a hose engaging portion 684. Instead of a shaft (582) to fit in an opening (546, 564), such as shown in FIG. 12; or a shaft hollow (485) to fit over a receiving portion (444, 462), such as shown in FIG. 10; jaws 680 have a pair of spaced apart parallel shafts 683 having bores 687 therethrough. Shafts 683 of a jaw 680 slide over jaw receiving portion 644 and shafts 683 of the other jaw 680 slide over jaw receiving portion 662. Jaw retainers, not shown, such as cotter pins, nuts and bolts, etc. are inserted through bores 687/648 and 687/666 to retain jaws 680 on tool 630.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

What is claimed is:

1. A tool for reconnecting a hose end and a nozzle end of a fuel hose safety break away so that a fuel may flow therethrough, the hose end being connected to a pump hose having a first geometry and the nozzle end being connected to a nozzle hose having a second geometry, the tool comprising:

a. at least a first and a second receivable jaw, said first and said second jaw having a hose engaging portion, said hose engaging portion connected to at least one shaft, said hose engaging portion of said first jaw having a first shape to receive at least a portion of said pump hose first geometry and to abut said hose end of said safety break away, said hose engaging portion of said second jaw having a second shape to receive at least a portion of said nozzle hose second geometry and to abut said nozzle end of said safety break away;

b. a first member and a second member, said first and said second members having a pivotal connection therebetween, said first member having a first end and a second end, said second member having a first end and a second end, said first ends of said first and said second members being a handle portion, said first member including means for receiving said at least one shaft of said first receivable jaw, said receiving means being movable along a portion of said first member, and said second end of said second member including means for receiving said at least one shaft of said second receivable jaw, said first receivable at least one jaw shaft being received by said first member receiving means and said second receivable at least one jaw shaft being received by said second member receiving means;

c. the operation of said first end of said first member toward said first end of said second member forcing said first and said second receivable jaws toward each other to exert reconnecting pressure on the safety breakaway.

2. In the tool of claim 1, where said first shape and said second shape are a semi-circular shape.

3. In the tool of claim 2, said first member having means for retaining said means for receiving said at least one shaft of said first receivable jaw, said retaining means being toward said second end.

4. The tool of claim 3, where said retaining means comprises a bore through said first member toward said second end and a retainer received by said bore.

5. In the tool of claim 1, said first member having means for retaining said means for receiving said at least one shaft of said first receivable jaw, said retaining means being toward said second end.

6. The tool of claim 5, where said retaining means comprises a bore through said first member toward said second end and a retainer received by said bore.

7. The tool of claim 1, where said first member and said second member are primarily of circular cross-section of a first diameter, said first member receiving means comprising an adjustable jaw receiving portion (436), said jaw receiving portion having an adjustment portion (438) and a jaw receiving portion (444), said adjustment portion having a bore (440) therethrough, bore (440) having a second diameter, said second diameter having a value greater than said first diameter, thereby permitting said adjustable jaw receiving portion (436) to be moved along said portion of said first member (442).

8. The tool of claim 7, where:

a. said jaw receiving portion (444) of said first member receiving means is of circular cross-section, said at least one shaft (482) of said first jaw having a hollow (485) therein, said hollow (485) receiving said jaw receiving portion (444);

b. said receiving means (462) of said second end of said second member is of circular cross-section, said at least one shaft (482) of said second jaw having a hollow (485) therein, said hollow (485) receiving said receiving means (462).

9. In the tool of claim 8, said first member having means for retaining said means for receiving said at least one shaft of said first receivable jaw, said retaining means being toward said second end.

10. The tool of claim 9, where said retaining means comprises a bore through said first member toward said second end and a retainer received by said bore.

11. The tool of claim 1, where said first member is primarily of rectangular cross-section of a first length and a first width, said first member receiving means comprising an adjustable jaw receiving portion (536, 636), said jaw receiving portion having a slot (540) therethrough, slot (540) having a second length and a second width, said second length and said second width having values greater than said first length and said first width, respectively, thereby permitting said adjustable jaw receiving portion (536, 636) to be moved along said portion of said first member (542, 642).

12. The tool of claim 11, where:

a. said adjustable jaw receiving portion (536) of said first member receiving means includes an opening (546) of circular cross-section, said at least one shaft (582) of said first jaw having a circular cross-section, said opening (546) receiving said shaft (582);

b. said receiving means (562) of said second end of said second member includes an opening (564) of circular cross-section, said at least one shaft (582) of said second jaw having a circular cross-section, said opening (564) receiving said shaft (582).

13. In the tool of claim 12, said first member having means for retaining said means for receiving said at least one shaft of said first receivable jaw, said retaining means being toward said second end.

14. The tool of claim 13, where said retaining means comprises a bore through said first member toward said second end and a retainer received by said bore.

15. The tool of claim 11, where:

a. said adjustable jaw receiving portion (636) of said first member receiving means includes a portion (644) of rectangular cross-section, said at least one shaft (683) of said first jaw comprising a pair of spaced apart parallel shafts (683) having a rectangular cross-section, said shafts (683) receiving said portion (644) therebetween, said tool further including means for retaining said portion (644) between shafts (683);

b. said receiving means (662) of said second end of said second member is of rectangular cross-section, said at least one shaft (683) of said second jaw comprising a pair of spaced apart parallel shafts (683) having a rectangular cross-section, said shafts (683) receiving said receiving means (662) therebetween, said tool further including means for retaining said receiving means (662) between shafts (683).

16. In the tool of claim 15, said first member having means for retaining said means for receiving said at least one shaft of said first receivable jaw, said retaining means being toward said second end.

17. The tool of claim 16, where said retaining means comprises a bore through said first member toward said second end and a retainer received by said bore.

18. The tool of claim 1, including first means for retaining said first receivable at least one jaw shaft received by said first member receiving means and second means for retaining said second receivable at least one jaw shaft received by said second member receiving means.

* * * * *